United States Patent [19]

Twitchell et al.

[11] 4,268,054

[45] May 19, 1981

[54] CHILD TRANSPORT VEHICLE

[76] Inventors: Brent L. Twitchell, 3451 W. 4400 So., Granger, Utah 84120; Kendel S. Twitchell, 1569 Shenandoah Cir., Murray, Utah 84107

[21] Appl. No.: 48,823

[22] Filed: Jun. 27, 1979

[51] Int. Cl.³ .................................................. B62M 1/14
[52] U.S. Cl. ............................ 280/242 WC; 188/2 F; 297/DIG. 4
[58] Field of Search .................. 188/27, 2 F; 280/211, 280/242 R, 242 WC, 282, 289 WC, 281 W, 647, DIG. 10, 164 R, 166; 16/35 D; 301/63 PW, 105 B; 180/210, DIG. 3; 297/183, 294, 295, DIG. 2, DIG. 4, 300, 418, 448, 433

[56] References Cited

U.S. PATENT DOCUMENTS

| | | | |
|---|---|---|---|
| 909,411 | 1/1909 | Hockney | 297/DIG. 4 |
| 2,427,161 | 9/1947 | Roe | 188/2 F |
| 2,583,858 | 1/1952 | Kostolecki | 16/35 D |
| 2,612,209 | 9/1952 | Alldredge et al. | 297/DIG. 4 |
| 2,869,686 | 1/1959 | Glanz | 280/242 WC |
| 3,006,688 | 10/1961 | Ouellette | 297/DIG. 2 |
| 3,021,889 | 2/1962 | Mize | 297/433 |
| 3,025,105 | 3/1962 | Nash | 297/DIG. 2 |
| 3,301,574 | 1/1967 | Good | 280/242 WC X |
| 3,862,779 | 1/1975 | Jayne | 301/63 PW X |
| 3,897,857 | 8/1975 | Rodaway | 188/2 F |

Primary Examiner—John J. Love
Assistant Examiner—Randall A. Schrecengost
Attorney, Agent, or Firm—M. Reid Russell

[57] ABSTRACT

A wheeled transport vehicle for providing mobility to a handicapped child preferably consisting of a one-piece contoured plastic seat that is secured between side frame sections that rise and join in a high arc above a seat back portion as a hand grip area, the frame sections including arm and headrest members, with an axle member secured thereacross below the seat with ends thereof extending beyond the seat-sides that have large air inflated tires mounted on wheels journaled thereon, the frame further including a curved arm that mounts a caster thereon to provide a third point of ground contact. The present invention, in one embodiment, provides vehicle braking by appropriate movement of the pivoting handle or by stepping onto a vehicle step that is pivotally connected across the frame and connects to, pivot with, the pivoting handle, thereby moving the bar locks against both inflated tires.

12 Claims, 8 Drawing Figures

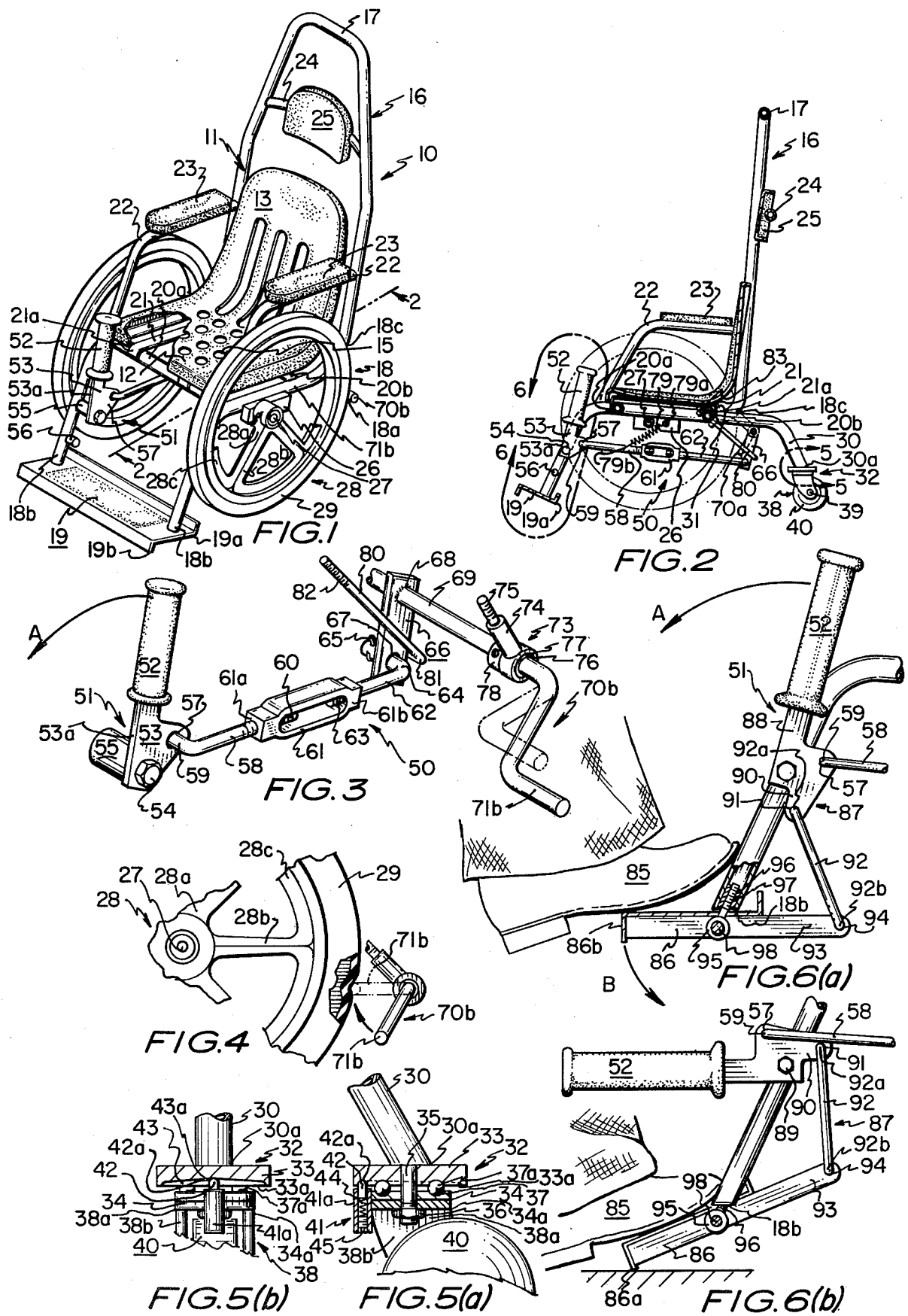

CHILD TRANSPORT VEHICLE

DESCRIPTION OF THE INVENTION

1. Field of the Invention

This invention relates to wheel mounted chairs and platforms useable to transport an ill or handicapped person.

2. Prior Art

In the area of transport vehicles or wheelchairs, as in most walks of life, the needs and desires of the adult have taken precedent or priority over those of children. The present invention departs from such prior precedent and teaches a transport vehicle intended to fit the body and meet the mobility needs of a handicapped child that will also present a pleasing appearance to that child. Certainly, chairs mounted on wheels for transporting of persons are well-known, and, though such chairs are today generally collapsible, one such wheelchair shown in a patent by Sieber, U.S. Pat. No. 4,101,143, have in the past been mounted to rigid frames and supported on various configurations of wheels. The present invention provides a simplified chair construction over former like devices, utilizing a single piece tubular frame that is appropriately bent to form both sides and a hand grip area. The tubular frame of the present invention supports a contoured single piece chair portion, and, while molded seats are shown in patents by Schwartz and Ball, U.S. Pat. Nos. 4,057,288 and 4,119,163, these seats do not provide vent openings therethrough and are otherwise unlike the seat of the present invention. The frame and seat of the present invention are, in turn, preferably supported on large air filled tires and a single caster wheel at the back thereof, which large air filled tires are like wheels currently used on a childs trail bike, thereby presenting an appealing appearance to a young person.

Additional to the distinctive configuration of the seat and frame of the present invention, the present invention also includes a simple yet reliable brake system that is operated through a single pivoting handle. Unique to the present invention the operating handle is accessable to a person sitting in the seat, whose operation moves a pair of lock bars into engagement with both the air filled tires, providing a positive restraint against wheel turning. While brake arrangements for wheelchairs are shown in patents by Mulholland and Connolly, U.S. Pat. Nos. 3,761,126 and 2,259,924, these arrangements are unlike that of the present invention.

The present invention further includes means for stabilizing the tracking of a single rear caster that connects to the frame in the area of the chair back and is for encouraging the chair to move in a straight line. Also, in second embodiment the present invention includes, rather than a fixed step like that shown in a patent by Sill, U.S. Pat. No. 2,339,361 a hinged step that is linked to the braking system whereby the brake system can be operated by appropriate pivoting of either the described handle or by pivoting the step, which step configuration is also unlike anything within the knowledge of the inventors.

The present invention involves a simple wheeled vehicle that can be manufactured from relatively inexpensive materials and is therefore a less expensive compliment to adult-type wheelchairs. Further, the present invention provides a wheelchair that is more appealing to a younger person than is a conventional adult wheelchair.

Within the knowledge of the inventors there has not heretofore existed a child transport vehicle like that of the present invention. The present invention is, therefore, believed to be both novel and unique and a significant improvement in the art.

SUMMARY OF THE INVENTION

It is the principal object of the present invention in a child transport vehicle to provide a light-weight wheeled transport vehicle for use by a handicapped child, providing a vehicle that has both an aesthetically pleasing appearance and is inexpensive to construct.

Another object of the present invention is to provide a child transport vehicle that includes a rigid frame essentially formed from a single section of tubing whereto is connected a onepiece molded seat, that is supported on aesthetically pleasing large inflated tires, and includes a brake or wheel locking arrangement therewith.

Another object of the present invention is to provide a transport vehicle fabricated from inexpensive materials by conventional tube bending and plastic molding techniques, that is therefore inexpensive to produce yet will provide an aesthetically pleasing appearance to a handicapped child that includes a positive wheel brake or lock arrangement that then can be operated by a patient sitting in the seat.

Still another object of the present invention in a child transport vehicle is to provide, as an alternative arrangement for energizing the wheel brake, step that is pivotally coupled to the frame that, by stepping thereon, operates the brake or lock arrangement.

Still another object of the present invention in a child transport vehicle is to provide a centering arrangement to insure that the vehicle will tend to track in a straight line with an occupant therein.

Principle features of the present invention in a child transport vehicle include a frame formed preferably of steel tubing, or the like, that is bent at the center thereof to form a hand grip area and along the two halves to form essentially S-shaped parallel sides and includes tubular members secured thereacross. The S-shaped sides and the cross members support a single unit seat and back configurate that is preferably contoured to fit a persons body, preferably formed by molding methods from a plastic material. The contoured seat can have a number of holes formed therein for circulating air and eliminating materials therethrough without a sacrifice of strength, which contoured seat is preferably mounted onto a leaf-configuration supported to the frame to provide a certain flexure thereto as for cushioning travel of a handicapped child therein.

An axle is secured across the frame sides whereto are journaled wheels with large inflatable tires. The wheels are preferably of a modern design like those used on currently-popular trail bikes, or the like, where the rim and spokes thereof formed of nylon, or the like. Extending outwardly and downwardly from the center of the frame is secured a member that mounts on its end a single ground engaging caster for providing support and directional control to the chair as it is moved. This caster preferably includes an arrangement therewith for centering the caster wheel such that the wheelchair, as it is moved tends to travel in a straight line.

The present invention preferably incorporates a brake or wheel locking system therewith for holding the chair in position. A first embodiment of that arrangement consists of a pivoting handle that is appropriately coupled to a linkage wherethrough, when the handle is pivoted appropriately, dogleg ends of a single brake rod move into locking engagement against both tires, holding the wheelchair in place until the handle is pivoted appropriately to move the dogleg ends out of contact with the tires. The pivoting handle is arranged to be either patient operated or operated by another person, as required.

The above outlined brake system arrangement preferably includes a rigid step that is secured across the ends of the frame sides. The step is arranged to contact the ground, when the chair is rotated around the large air inflated tires, to bind thereagainst to limit slippage and to facilitate a handicapped person's getting into or out of the vehicle. In another embodiment of a preferred brake or wheel locking system, the step is pivotally coupled across the frame ends and is rigidly linked to the described pivoting handle whereby, with appropriate rotation of the handle or appropriately stepping on the step, the brake or wheel locking system is moved to a locked attitude. Thereby, the present invention provides two different brake energizing arrangements to operate the brake system.

Further objects and features of the present invention in a child transport vehicle will become more apparent from the following detailed description, taken together with the accompanying drawings.

THE DRAWINGS

FIG. 1, is a perspective view of a first embodiment of a child transport vehicle of the present invention incorporating a fixed step therewith;

FIG. 2, a sectional view taken along the lines 2—2 of FIG. 1, showing frame and chair components;

FIG. 3, a preferred brake or wheel locking system of the child transport vehicle of FIGS. 1 and 2 showing a portion of a brake rod component broken away, a remaining dogleg end of the brake rod shown in solid and broken lines, illustrating movement thereof when a handle shown therein is rotated as shown by arrow A;

FIG. 4, shows the dogleg end of the brake rod of the brake as shown by solid and broken line representations, to engage so as to prohibit turning of an air inflated tire;

FIG. 5(a), a sectional view taken within the line 5—5 of FIG. 2, showing an arrangement for encouraging the caster wheel to travel in a straight line that involves a spring biased detent arranged to travel in a track that peaks at a position where the caster wheel is properly aligned;

FIG. 5(b), an end view of the caster wheel of FIG. 5(a);

FIG. 6(a), a sectional view of the portion of the present invention within the line 6—6 of FIG. 2, only involving an embodiment of a pivoting step that is shown arranged as part of the brake system, showing the pivoting step shown linked such that, as shown therein, an occupant's foot pressing on the front of that step will pivot it and a connected bell crank end of a pivoting handle to engage a brake or wheel locking system; and FIG. 6(b), a view like that of FIG. 6(a) only showing the occupant's foot as having depressed the step, rotating the bell crank and pivoting handle appropriately a front edge area of the step shown engaging the ground.

DETAILED DESCRIPTION

Referring now to the drawings:

In FIG. 1 is shown a preferred embodiment of a child transport vehicle 10 of the present invention, hereinafter referred to as transport vehicle, that includes a one-piece chair 11 that has a seat 12 and back 13. Chair 11 is contoured to fit the body of a child or small person and obviously may be formed in any number of sizes, shapes and colors to fit a handicapped child's needs and desires. The chair 11 is preferably formed by molding, or like methods, from a synthetic resinous material such as VIRCL mode 9000 plastic or some other suitable shape-retaining material. The chair seat 12, preferably, but not necessarily incorporates a number of spaces holes or apertures 15 formed therethrough for reducing the amount of material used in making the chair 11 and providing for both ventilation and liquid drainage, as needed, for a handicapped child seated in the chair 11, not shown.

Shown in FIG. 1, chair 11 is supported between the sides of a frame 16, which frame 16 is preferably formed from a single piece of round stock material, such as a tubular steel, or the like, that is bent at approximately the center thereof into a high arch hand grip area 17 and is also bent appropriate to form sides shown at 18. Each side 18, preferably, is formed to have somewhat of a lying down S-shape, the middle thereof 18a supporting chair 11 therealong. So arranged, chair 11 is supported between the frame sides 18 and above cross pieces 20a and 20b that extend between the middles 18a of the frame sides 18. Chair 11, below the seat 12 thereof, is secured as by pop-riveting, bolting, or like methods, to leaf-spring members 21. Leaf spring members 21 are shown in broken away portion of the seat 12 in FIG. 1 as having ends 21a that are bent over to partially around cross pieces 20a and 20b and can be fastened thereto as by welding, or like methods.

So arranged, the chair 11, at seat 12, is secured to the leaf-spring members 21 that in turn, are secured at their ends 21a to front and rear cross pieces 20a and 20b forming, thereby, a seat support that has some flexure or cushioning for stabilizing the ride of a child seated therein. Shown in FIGS. 1 and 2, transport vehicle 10 preferably includes arm rest frame members 22 that are secured at their ends across the middles 18a of frame sides 18 as by welding, bolting, or like methods. To the arm rest frame members 22 are secured arm rests 23 so as to be approximately parallel to seat 12 and at a height therefrom convenient for a seated child to rest his arms. Preferably, a headrest support frame member 24 is included across the frame 16 below the handgrip 17 that is arranged to receive a headrest or pad 25 secured thereacross above the chair back 13 whereagainst an occupant's head can rest. While not shown, the headrest 25 could be arranged to pivot around the headrest support frame member 24 to allow for attitude adjustment thereof so as to more comfortably accommodate the handicapped persons head.

Shown best in FIG. 2, each frame side, below the middle 18a thereof, preferably has a block 26 secured thereto that extends downwardly away from seat 11. Through blocks 26 are secured an axle 27 that extends across and beneath the chair seat 12 whereon are journaled, at the ends thereof, wheels 28. While wheels 28 can be of a standard ordinary wheelchair configuration, such consisting of individually, a rubber tire that is mounted on a rim that is supported to a hub, as by metal spokes. However, as this is a vehicle for a child, it is preferred to utilize a wheel having a more modern and intrinsically pleasing appearance that will appeal to a young child who must spend time in this transport vehicle. Therefore, the present invention preferably utilizes a wheel having a hub, spokes and outer rim that are formed as a single unit, preferably formed from nylon. One such wheel is manufactured by Skyway Recreation Products, of Redding, California, that has been used extensively on moto-cross type bicycles, such bicycles currently being produced by Schwinn Bicycle Company. By incorporating such wheels with the present invention, the child occupant feels that he is riding in a modern appliance like the moto-cross bike that his peers are riding.

Shown best in FIG. 2, additional to the wheels 28 supporting the vehicle on the ground, a third point of ground contact is provided by inclusion of an essentially L-shaped tubular leg member 30 that is connected, on its one end to extend at a normal angle from the rearmost cross piece 20b and is joined thereto at 31 as by welding, or the like. On an opposite end 30a of the L-shaped member 30, as shown best in FIGS. 2, 5(a) and 5(b), is arranged a caster assembly 32. Caster assembly 32 preferably consists as shown best in FIGS. 5(a) and 5(b), of upper and lower plates 33 and 34 that are rotatably connected at their centers by a bolt and nut combination 35 and 36 fitted therethrough. Each plate includes a continuous semi-circular paths that align into a raceway 37, as shown best, in FIG. 5(a), is installed roller bearings 37a, or like friction reducing devices. So arranged, the lower plate 34 has secured across the bottom 34a thereof a base 38a of a U-shaped bracket 38. The U-shaped bracket 38 has opposite essentially parallel sides 38b that have appropriate holes formed therethrough for containing, as shown in FIG. 2, an axle 39 secured therethrough whereon is journaled a caster wheel maintained between bracket sides 38b. The caster wheel 40 thereby provides a third point of ground engaging contact for the transport vehicle 10. Without any restraining mechanism, the lower plate 34 would be, of course, free to pivot or rotate through three hundred and sixty degrees (360°) over upper plate 33, which arrangement would not be desirable as caster wheel 40 could tend to shimmy as it rolls along. To provide a restraining force against such free rotation, it is preferred to incorporate a detent arrangement 41, as shown best in FIG. 5(a) that is secured to lower plate 34 and extends upwardly therefrom such that an end 42a of a slug 42 portion thereof fits into an appropriate tapered raceway 43, as shown in FIG. 5(b), that is formed in the undersurface 33a of upper plate 33. As shown in FIG. 5(a), slug 42 is preferably biased by spring 44 to urge slug 42 upwardly from housing 41a that is secured to an edge of lower plate 34. Tension of spring 44 can be adjusted by appropriately turning, as with a screwdriver, a screw 45 arranged in detent housing 41a, turning thereof increases or decreases the spring tension against the undersurface of slug 42. Shown best in FIG. 5(b) the end 42a of slug 42 rides within the tapered raceway 43, that preferably peaks at 43a whereat, when the slug end 42a is positioned therein, the caster wheel 40 will be at a normal angle to cross piece member 20b and parallel to wheels 28, providing thereby for a desired positioning of the caster assembly 32.

As transport vehicle 10 will rotate or pivot around wheels 28, such rotation either brings a step 19 that is secured across frame ends 18b, or caster wheel 40 into ground contact. Such ground contact with step 19 either brings a down turned forward lip 19b or an edge 19a of a rear upwardly turned lip into ground contact providing some wheelchair stability when a person is exiting or entering the vehicle. However, it is also desirable to provide a brake or wheel locking system hereinafter referred to as brake system for holding the chair in place as required. The present invention provides such a brake system that is shown best in FIGS. 2 and 3 at 50. Shown therein, the brake system 50 preferably consists of a handle 51 that has a hand grip 52 therewith. Handle 51 is secured to a bell crank 53 that is, in turn, pivotally maintained to the frame chair support portion above an end 18b thereof by a bolt 54 fitted therethrough and through a sleeve 55. With respect to a handicapped child, not shown, sitting in the transport vehicle 10, the brake assembly 50 is preferably arranged on the right-hand side thereof. However, depending on the patient's needs, as say if he is left-handed, this assembly could be arranged on the left-hand side thereof without departing from the scope of the present invention. So arranged, handle 51 can be rotated, as shown by arrow A, pivoting the bell crank 53 therewith, with travel of the handbrake assembly 51 limited by contact of a forward edge 53a of belt crank 53 against a stop pin 56, as shown in FIGS. 1 and 2. Release of the brake system is effected by pivoting of handle 51 back to the attitude shown in FIGS. 1 and 2.

Shown in FIG. 3, pivoting of bell crank 53 moves forward a forward brake rod 58 that has a dogleg end 59 thereof fitted into and secured through a hole 57 formed appropriately in the bell crank 53. The forward brake rod 58 has rearmost threaded end 60 that is turned into an end 61a of a turnbuckle 61. The turnbuckle 61 is included herewith to provide for a length adjustment between forward and rear brake rods 58 and 62. A rearmost end 61 of turnbuckle 61 in turn, has a threaded end 63 of a rear brake rod 62 turned therein and includes a dogleg 64 formed in the opposite end that is fitted through an appropriate hole 67 formed in a lug member 66. To maintain rear brake rod dogleg 64 through said hole 67, a cotter pin 65 or the like, is preferably installed through a hole formed through the dogleg end. Shown best in FIG. 3, lug member 66 has a brake axle 69 through an aperature 68 secured thereto, as by welding, or the like, formed in an upper end of the lug member 66. Brake axle 69 on both ends 70a and 70b thereof, has two S-shaped doglegs formed therein, which ends have tire engaging surfaces 71a and 71b that, as shown in FIG. 4, engage and lock against and into tires 29 when brake system 50 is appropriately operated.

A pair of eyelets 73 are provided, for maintaining brake axle 69 to the chair frame 16, one of which eyelets 73 is shown in FIG. 3. Shown therein, eyelet 73 preferably consists of a stem 74 that extends from the frame 16 and has a threaded end 75, that is fitted through an appropriate opening or hole formed through the frame proximate to the bend 18c therein. A nut, or a like fastener, not shown, is turned over threaded end 75 for securing the stem 74 to the frame. Each eyelet 73 preferably has an appropriate roller bearing 77, or the like, fitted in an opening 76 therethrough, through which bearing 77 brake axle 69 is journaled. So arranged, the brake axle 69 is supported by a collar 78 to limit back and forth movement thereof and is pivotable, as described, to bring the dogleg ends 70a and 70b into and out of engagement with tire 29.

The brake system 50 is preferably biased to an unlocked attitude, which biasing, as shown best in FIG. 2, is preferably provided by a spring 79, that is connected at one end 79a to block 25 and at its other end 79b to the forward brake rod 58. Also, for controlling travel at brake rods 58 and 62 a J-shaped stop bar 80 is threaded appropriately to fit through the rear most frame cross piece 20b and is secured therethrough as by nuts 83, turned on either side of the rear cross piece, as shown in FIG. 2. Travel of handle 51 past a desired verticle attitude is thereby prohibited by contact of the lug member 66 against the J-shaped and 81. To release brake system 50, the handle 51 is rotated upwardly back to the attitude shown in FIGS. 1 through 3.

In FIGS. 6(a) and 6(b) is shown another arrangement of a brake system 87 that is like the described brake system 50 and additionally includes and arrangement for operating that brake system whereby a person shown as a foot 85, other than the transport vehicle 10 occupant can conveniently operate the brake system by depressing with foot 85 a pivoting step 86. In operation foot 85 steps on a front edge 86b of step 86 thereof pivoting the step as shown by arrow B in FIG. 6(a) with pivoting also bell crank 88 whereto is connected the handle 51 and moving the brake axle tire engaging surfaces 71a and 71b against tire 29. The brake system 87 can therefore be operated by pressing downwardly on a pivoting step 86 or by manually pivoting handle 51 as shown and described with respect to FIG. 3. This brake system 87 bell crank 88 is essentially like the described bell crank 53 and includes a hole 57 therethrough for maintaining a dogleg end 59 of forward of brake rod 58 therein. As bell crank 88, like bell crank 53, is pivotally coupled by bolt 89 to frame 16 above end 18b thereof. Bell crank 88 additional includes a lug 90 extension thereto that has a hole 91 formed therethrough for receiving an end 92a of a step energizer rod 92 that has an opposite end 92b bent at a right angle and fitted through an aperature 94 formed in the end of a step extension 93. The step extension is secured to extend from the back of the step 86, that is shown best in FIG. 6(a), is pivotally coupled to frame end 18b by an eyelet 95. The pivotal coupling consists of a threaded shank end 96 that is turned appropriately into an internally threaded sleeve 97 that is secured into frame end 18b. A round post 98 extends from each step 86 end that is fitted to pivot freely in eyelet 95. Thereby, the step 86 can pivot between the attitudes shown in FIGS. 6(a) and 6(b) when the operator's foot 85 is appropriately applied thereto. So operated, a forward step lip 86a thereof will engage the ground and the step extension 93 and connected step energizer rod 92 will be moved upwardly, pivoting also the handle 51 between the attitudes shown in FIGS. 6(a) and 6(b). So arranged, by appropriately stepping on step 86, the operator 85 can engage the described brake system 50, with release of the brake system accomplished by an operator 85 either lifting with his toe the step proximate to step lip 86a, or by rotating handle 51 upwardly as has been described.

While not shown herein, and not part of the present invention, it should be understood that a seat belt can be included with the transport vehicle 10 of the present invention, and the vehicle can optionally include a head restraining strap and even arm restraining straps, as needed. Preferably, the frame members, as stated earlier herein, are formed from a tubular steel, or the like, though they could be formed of another strong and light-weight material and, of course, the frame could be fabricated using other than tube bending methods. While a preferred embodiment of chair 11 has been shown herein as being a single one-piece molded plastic unit, it should be obvious that other configurations of seats could be so employed without departing from the subject matter coming within the scope of this disclosure. Also, it should be obvious that seat 11 can be formed to accommodate various sizes of persons therein and, while it is preferred for use with children, it can also be adapted for use by adults as desired without departing from the scope of the subject matter coming within this disclosure.

While it is preferred to include with the present invention 41 for providing desired wheel 40 tracking, as shown in FIGS. 5(a) and 5(b), it should be understood that such is not required for the proper operation of the transport vehicle 10 and so could be dispensed without departing from the subject matter coming within the scope of this disclosure. Further, while the double-acting brake system operated by handle 51 or by depressing one such brake system need be included with the transport vehicle 10 of the present invention.

The transport vehicle 10 as shown in the enclosed drawings should be considered to be illustrative of the present invention, but it should be understood that forms or arrangements could be employed without departing from the spirit and subject matter coming within the scope of this disclosure. Therefore, the present invention should be taken as being made by way of example and that variations are possible without departing from the subject matter coming within the scope of the following claims, which claims we regard as our invention.

We claim:

1. A child transport vehicle comprising,
a frame formed from a single section of material defining
spaced apart side frames and a hand grip area thereabove and includes separate cross piece members secured to and spanning between said side frames, and further includes a step arranged between ends of said single section of material;
a contoured chair means that includes seat and back portions supported between said side frames for supporting a person therein;
a pair of relatively large wheels mounting air inflatable tires thereon and journaled to an axle secured between said side frames;
brake means for simultaneously engaging both large wheels, where said step is axially coupled between frame ends to pivot therearound, comprising,
a bell crank that is pivotally connected to a frame side, above said step and includes a handle means that extends therefrom convenient for manual operation to pivot said bell crank;
rod means pivotally coupled to said step and said bell crank for translating movement therebetween;
a brake axle journaled to said frame such that turning thereof brings dogleg ends thereof into engagement with said air inflated tires;
means arranged between said bell crank and said brake axle such that pivoting of bell crank is translated into turning of said brake axle; and
a caster wheel assembly means secured to and extending from said frame for providing a third point of ground contact.

2. A child transport vehicle as recited in claim 1 wherein the single section of material consists of,
a section of metal tubing bent centrally into the hand grip area; and
the sides formed by bending the tubing each have essentially a lying down S-shape.

3. A child transport vehicle as recited in claim 1, further including leaf spring means secured between a seat portion of the chair and the cross piece members for providing support and cushioning.

4. A child transport vehicle as recited in claim 1, wherein the contoured chair is formed as a single unit from a synthetic resinous material.

5. A child transport vehicle as recited in claim 4, wherein spaced holes are formed through seat and back portions of the chair.

6. A child transport vehicle as recited in claim 1, wherein the large wheels are each formed by molding methods from
a synthetic resinous material as a single unit consisting of a hub connected by radial spaced spokes to a rim.

7. A child transport vehicle as recited in claim 6, wherein each wheel is formed from a nylon material.

8. A child transport vehicle as recited in claim 1, further including means for encouraging the caster wheel assembly means to track as the transport vehicle is moved in a straight line.

9. A child transport vehicle as recited in claim 1, wherein the caster wheel assembly means consists of,
an L-shaped frame member that is secured on one end to a rear most frame cross piece member to extend at a normal angle therefrom;
upper and lower disks pivotally coupled at centers thereof said upper disk secure to the other end of said L-shaped frame member, and the lower disk includes a U-shaped bracket that is secured at its base to said lower disk such that sides thereof extend parallel to one another and at a normal angle from said lower disk; and
a wheel journaled between said U-shaped bracket sides.

10. A child transport vehicle as recited in claim 9, further including a detent means secured to the lower disk such that an end of a slug portion thereof extends therefrom into engagement with the under-surface at the upper disk;
a tapered raceway formed in said upper disk under-surfaced aligned to receive said slug portion end; and
means associated with said tapered raceway for positioning said slug portion end appropriately therein where the plane of the wheel of the caster wheel assembly means will be parallel to the planes of the large wheels.

11. A child transport vehicle as recited in claim 1, wherein the brake axle is journaled through a pair of eyelet bearing means that are each secured to and extend from the frame.

12. A child transport vehicle as recited in claim 1 further including means for limiting rotation of the brake axle; and means for limiting the arc of travel of the bell crank.

* * * * *